United States Patent [19]

Melvin, Jr. et al.

[11] Patent Number: 5,748,143
[45] Date of Patent: May 5, 1998

[54] ADAPTIVE POST-DOPPLER SEQUENTIAL BEAM PROCESSOR

[75] Inventors: William L. Melvin, Jr., Rome; Michael C. Wicks, Utica, both of N.Y.

[73] Assignee: The United States of America as represented by the Secretary of the Air Force, Washington, D.C.

[21] Appl. No.: 762,359

[22] Filed: Dec. 9, 1996

[51] Int. Cl.$^6$ .............................. G01S 13/53; G01S 7/292
[52] U.S. Cl. ................... 342/162; 342/140; 342/145; 342/146; 342/189; 342/196
[58] Field of Search ....................... 342/159, 160, 342/161, 162, 90, 25, 95, 96, 97, 140, 145, 146, 158, 189, 192, 194, 195, 196

[56] References Cited

U.S. PATENT DOCUMENTS

| | | | |
|---|---|---|---|
| H108 | 8/1986 | Gerlach | 342/196 |
| H792 | 6/1990 | Sanyal et al. | 342/17 |
| 3,725,922 | 4/1973 | Brennan et al. | 342/89 |
| 4,028,697 | 6/1977 | Albanese et al. | 342/159 |
| 4,219,812 | 8/1980 | Rittenbach | 342/110 |
| 4,578,676 | 3/1986 | Harrison, Jr. | 342/89 |
| 4,680,589 | 7/1987 | Bryant et al. | 342/196 |
| 4,719,466 | 1/1988 | Farina et al. | 342/159 |
| 5,173,706 | 12/1992 | Urkowitz | 342/99 |
| 5,539,412 | 7/1996 | Mendelson | 342/192 |
| 5,646,623 | 7/1997 | Walters et al. | 342/129 |

OTHER PUBLICATIONS

Melvin, William L., Sample Selection for Covariance Estimation in Practical Airborne Environments, RL-TM-96-5, In-House Report Sep. 96.

Melvin, William L., Nonhomogeneity Detection for Adaptive Signal Processing, Proceedings of the IASTED International Conference, Signal & Image Processing (SIP 96)Nov. 11-14, 96, 9 pages.

Melvin, William L.; Wicks, Michael C.; Brown, Russell D., Assessment of Multichannel Airborne Radar Measurements for Analysis and Design of Space-Time Processing Architectures and Algorithms; Presented at IEEE 1996 National Radar Conference, Ann Arbor, MI, 13-16 May 96, 8 pages.

Melvin, William L.; Brown, Russell D.; Wicks, Michael C., Effects of Coherent Repeater Jamming on Space-Time Adaptive Radar (U), Presented at 1996 Joint Electronic Warfare Conference, 14-16 May 96 at Naval Postgraduate School, Monterey CA, 5 pages.

*Primary Examiner*—John B. Sotomayor
*Attorney, Agent, or Firm*—Harold L. Burstyn

[57] ABSTRACT

A signal processing system applies space-time adaptive processing ("STAP") to an airborne surveillance Doppler radar comprised of a single-channel, rotating antenna. The STAP substantially improves signal-to-interference-plus-noise ratio ("SINR"), thereby improving the detection of weak targets.

20 Claims, 11 Drawing Sheets

ADAPTIVE POST-DOPPLER SEQUENTIAL BEAM PROCESSOR

STATEMENT OF GOVERNMENT INTEREST

The invention described herein may be manufactured and used by or for the Government for governmental purposes without the payment of any royalty thereon.

BACKGROUND OF THE INVENTION

The present invention relates to airborne radar systems. The invention encompasses an adaptive processor for use in the radar system of an airborne surveillance aircraft with a rotating antenna. In particular, the present invention relates to improving the detection performance of an airborne surveillance radar system by improving signal-to-interference-plus-noise ratio ("SINR"), thereby making it easier to detect a target.

Adaptive processing for airborne surveillance typically involves linearly combining weighted spatial and temporal samples of radar signals. A signal processor computes the weights adaptively, that is, from the estimated statistics of the dynamically changing interference environment. Space-time adaptive processing ("STAP") maximizes SINR by adaptively combining temporal and spatial signal samples, thereby improving detection of weak targets. In the radar community, a processor that carries out STAP is known as a space-time adaptive processor.

Alternatively, the space-time adaptive processor can operate in the two-dimensional angle-Doppler frequency domain. Applying a two-dimensional Discrete Fourier Transform ("DFT") to the spatial and temporal samples provides a linear transformation from the space-time domain to the angle-Doppler frequency domain. Similarly, the adaptive weights can be computed and applied in the frequency domain. The two-dimensional linear DFT is equivalent to digital beamforming followed by Doppler processing. This transformation converts the spatial samples to angular frequency and the temporal samples to Doppler frequency respectively.

One assumes that the space-time adaptive processor operates on multiple correlated spatial samples from an airborne radar with multiple receive channels. Several radiating elements are combined to form each channel. The temporal samples result from the pulse-Doppler mode of typical airborne surveillance radar. One system that provides such spatial and temporal samples of radar signals is a pulse-Doppler, phased-array antenna.

Unlike such a system, many surveillance radars commonly employ a rotating antenna that has only a single receive channel, thus precluding a conventional space-time adaptive processor, which requires multiple receive channels. For example, slotted waveguides stacked vertically may comprise such a rotating antenna. Each waveguide aperture uses fixed analog hardware to combine the received signal into a single channel in a process called analog beamforming. To implement STAP on such a system requires costly hardware modifications or a complete redesign to create the required multiple spatial channels.

Thus there exists a need for implementing STAP onboard these single channel, rotating antenna, airborne surveillance platforms in a manner that eliminates costly redesign and/or reconstruction of the radar hardware.

SUMMARY OF THE INVENTION

This invention describes a STAP system for a single-channel, rotating antenna system that does not require any modifications to the fixed analog radar hardware. Rather, the present invention can be easily inserted into the existing signal processing chain by a digital signal processor ("DSP"). In the STAP system of the present invention, a frequency-domain STAP formulation operates on Doppler-processed adjacent receive beams.

Therefore one object of the present invention is to provide an adaptive post-Doppler sequential beam processor to improve the detection of weak targets.

Another object of the present invention is to provide an adaptive post-Doppler sequential beam processor that can be used with a surveillance radar.

Still another object of the present invention is to provide an adaptive post-Doppler sequential beam processor that can be used with a surveillance radar that employs a rotating antenna with but a single receive channel.

Briefly stated, the present invention discloses a signal processing system that applies STAP to an airborne surveillance Doppler radar comprised of a single-channel, rotating antenna. STAP improves SINR, thereby substantially improving the detection of weak targets.

The frequency-domain implementation of STAP can be modified for single channel, rotating antenna radar systems. In this case, the existing analog hardware creates beams in a given angular direction. Thus the output of the single radar channel is already in the angular frequency domain. The radar transmits multiple pulses, comprising a single coherent processing interval ("CPI"), for each angular direction as the antenna rotates. Although the beam is actually rotating slightly over each CPI, in an approximation, the beam is assumed to reside at a single angular frequency. Doppler processing, applied to the multiple temporal pulses in the CPI that correspond to this single angular frequency, provides the transformation to the Doppler frequency domain. Data is collected from several adjacent beams, each of which corresponds to one of several adjacent angular frequencies. The two-dimensional frequency domain implementation of STAP is applied to the Doppler-processed multiple beam positions that correspond to the single radar channel output.

Applying the apparatus and method of the present invention to measured airborne radar data demonstrates its utility.

These and many other objects and advantages of the present invention will be readily apparent to one skilled in the pertinent art from the following detailed description of a preferred embodiment of the invention and the related drawings.

DESCRIPTION OF THE PREFERRED EMBODIMENT

The objective of a STAP system for airborne radar is to maximize SINR, thereby enhancing detection performance. Conventional applications of STAP require a multi-channel, pulse-Doppler airborne radar system.

Figure 1A:
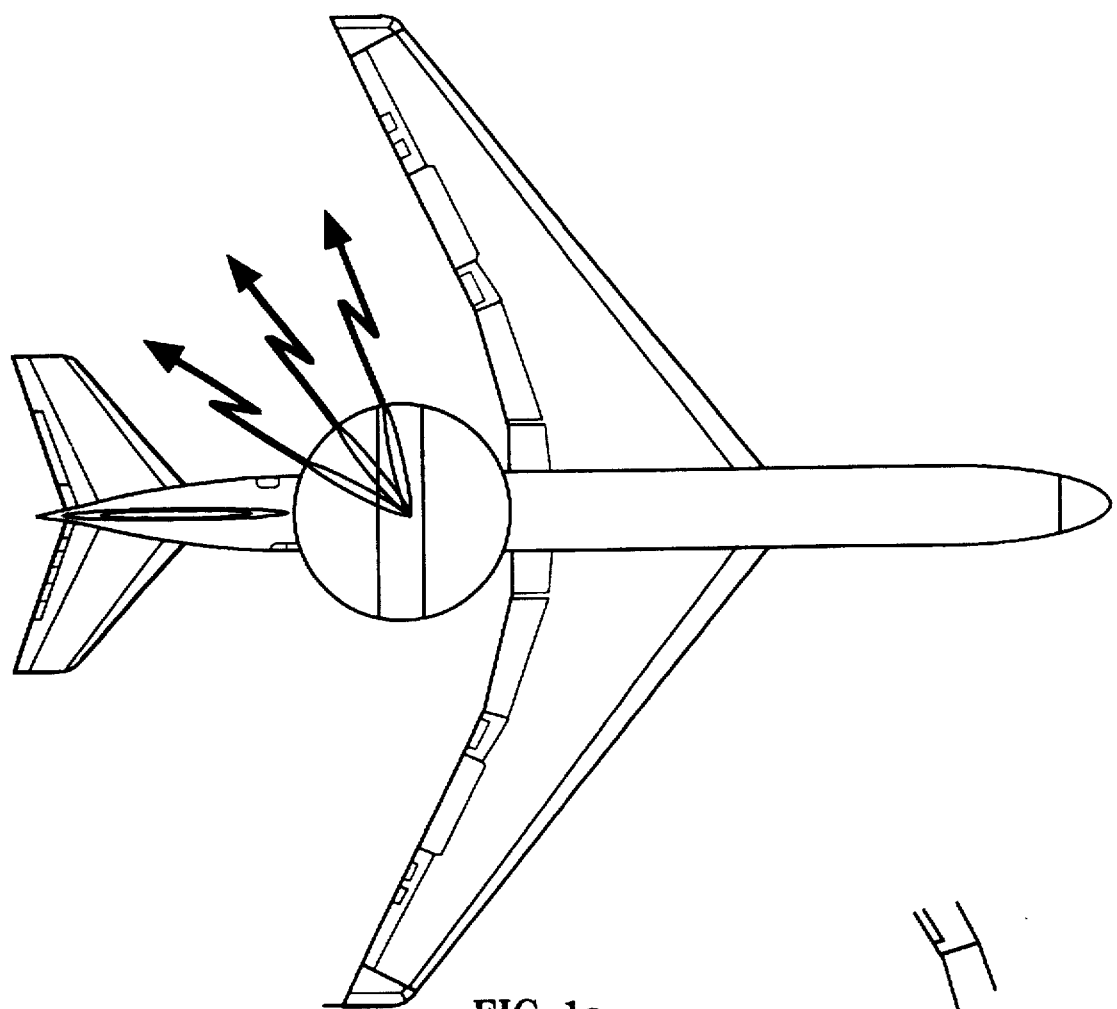
FIGS. 1A and 1B show a conventional airborne radar rotating antenna system mounted on an aircraft.
Figure 1B:
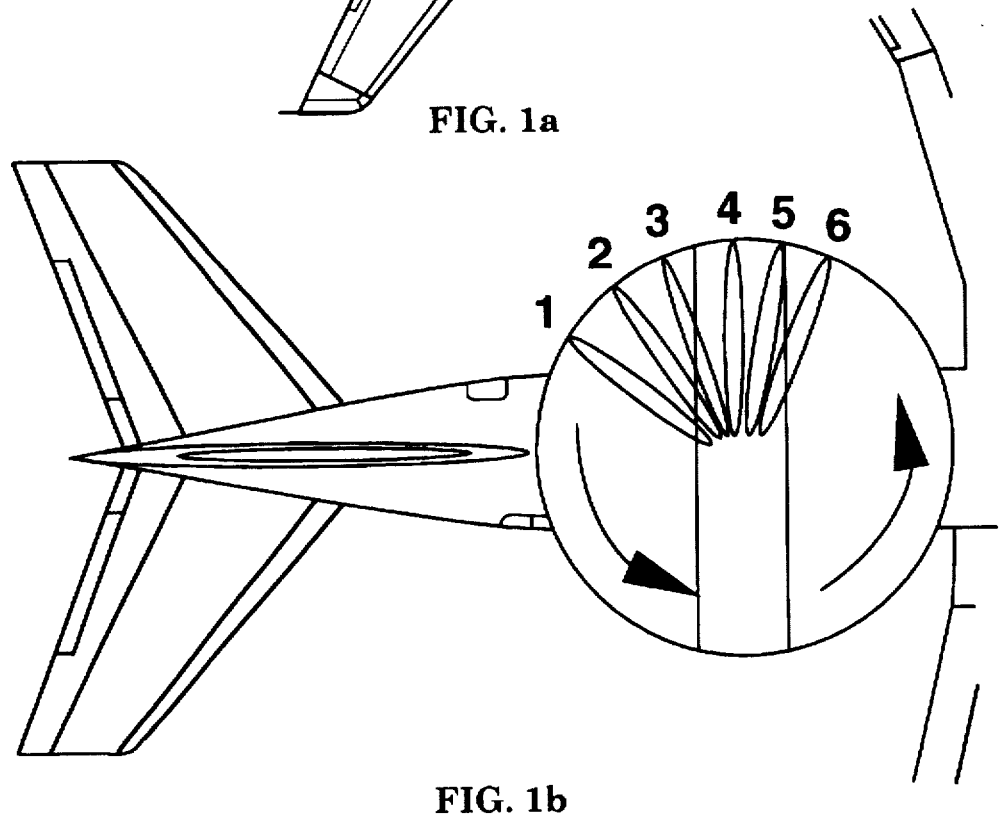

FIGS. 1A and 1B show a rotating antenna mounted on an aircraft together with several adjacent beam positions 1–6. Analog hardware forms a beam by combining individual signals at each waveguide element, yielding a single channel signal. Since only a single channel exists in this case, conventional STAP cannot apply.

Figure 2:
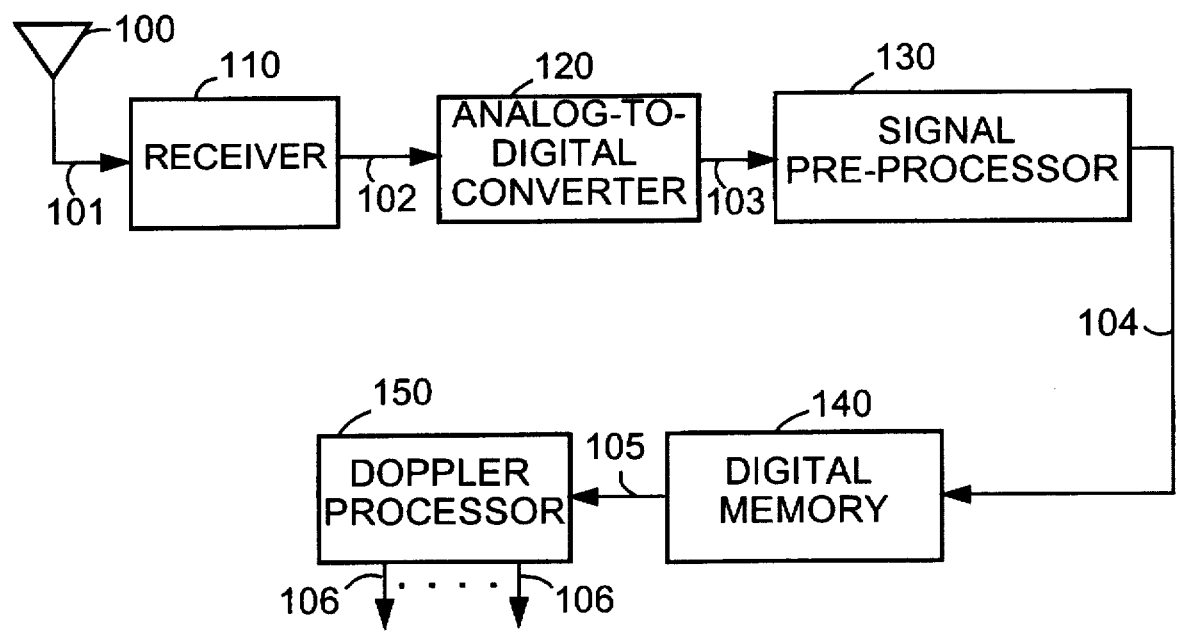
FIG. 2 is a block diagram of a prior-art signal processing chain.
Figure 3:
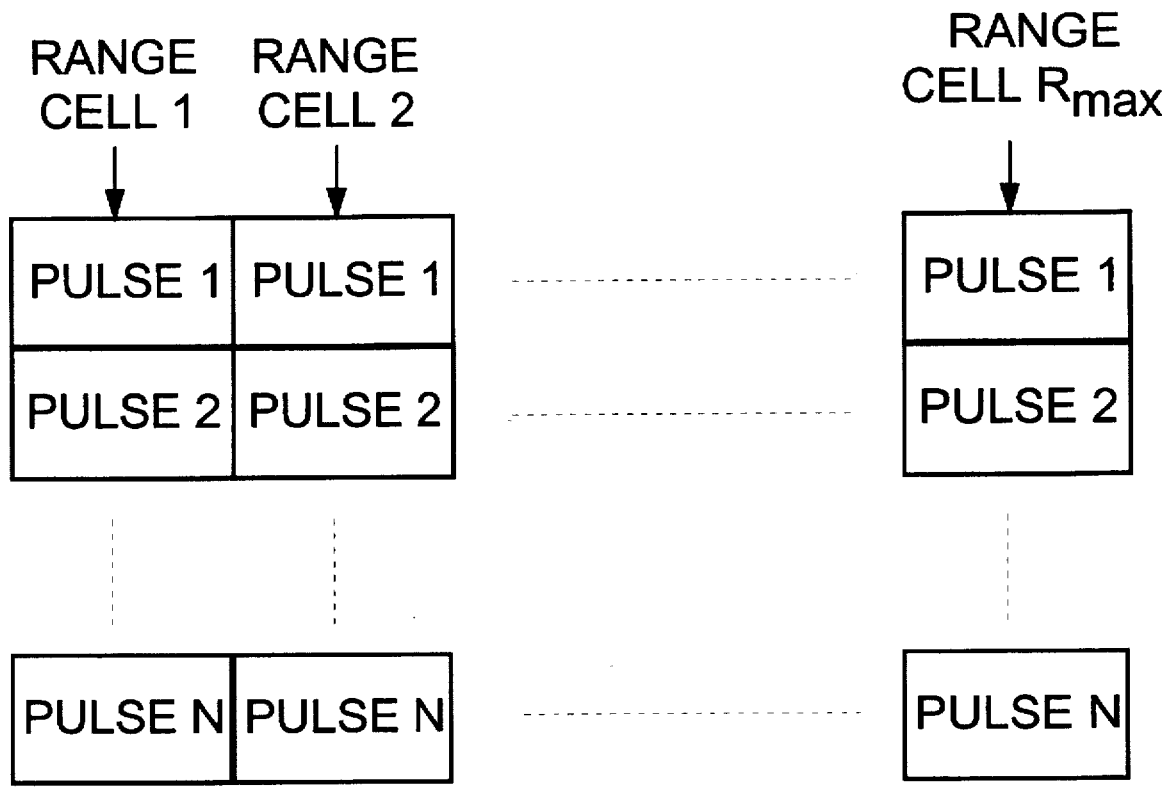
FIG. 3 is a diagram of radar signal pulse and range sample organization in digital memory for a single beam position.

FIG. 2 shows the prior-art signal processing block diagram for the single-channel, airborne rotating antenna system. A single receive channel 100 feeds a received radio frequency (RF) radar signal 101 into a receiver 110. Receiver 110 converts RF radar signal 101 to an intermediate frequency (IF) signal 102. IF signal 102 passes to an analog-to-digital converter 120 that samples IF signal 102. A sampled IF signal 103 enters a signal pre-processor 130 that processes sampled IF signal 103 by baseband conversion, digital in-phase and quadrature conversion, decimation, and pulse-compression. A digital, complex, baseband radar signal 104 enters a digital memory 140, where it is buffered for subsequent Doppler processing. FIG. 3 displays the storage of each discrete pulse for a selected beam position, j, and discrete range cell, k, as contained in digital memory 140. Referring again to FIG. 2, a signal vector 105, comprised of N pulses for range cell k and beam position j, passes to a Doppler processor 150. Doppler processor 150 operates on each column of pulses shown in FIG. 3.

Typical Doppler processing requires multiplying the signal vector by a weighting function and applying a fast Fourier transform ("FFT"). A Doppler-processed output is then available for subsequent signal and data processing steps, including detection and tracking. A high-pass filter (not shown) can be inserted ahead of Doppler processor 150 to mitigate some of the effects of ground clutter returns that enter the antenna's mainbeam. However, other forms of interference, including jamming, cannot be canceled by such a filter.

STAP can greatly improve detection performance over conventional methods by maximizing SINR in environments that contain various sources of interference. However, prior-art implementations have ignored the possibility of STAP in a radar system with a single channel, rotating antenna.

Figure 4:
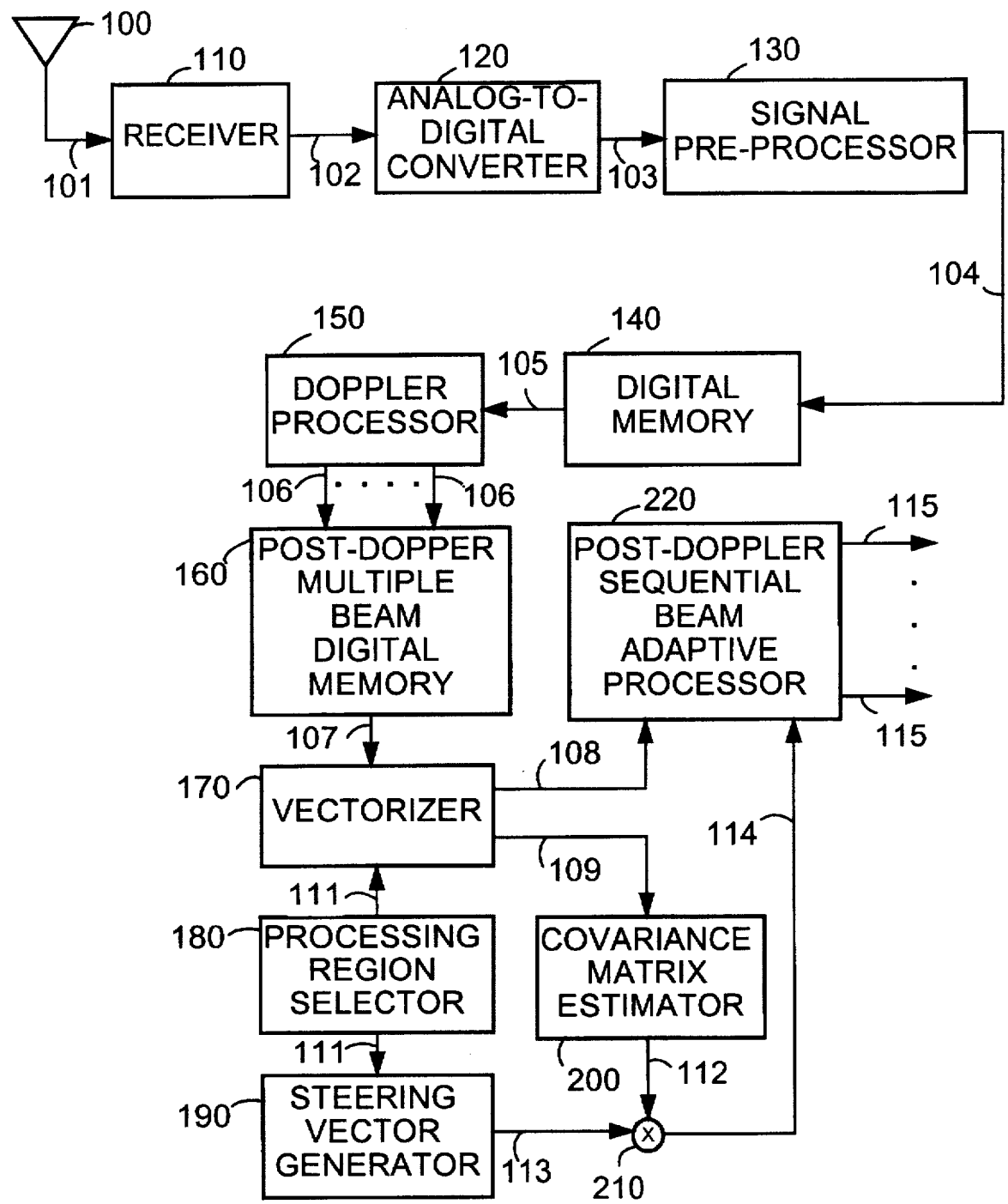
FIG. 4 is a block diagram of the adaptive post-Doppler sequential beam processor of the present invention.
Figure 5:
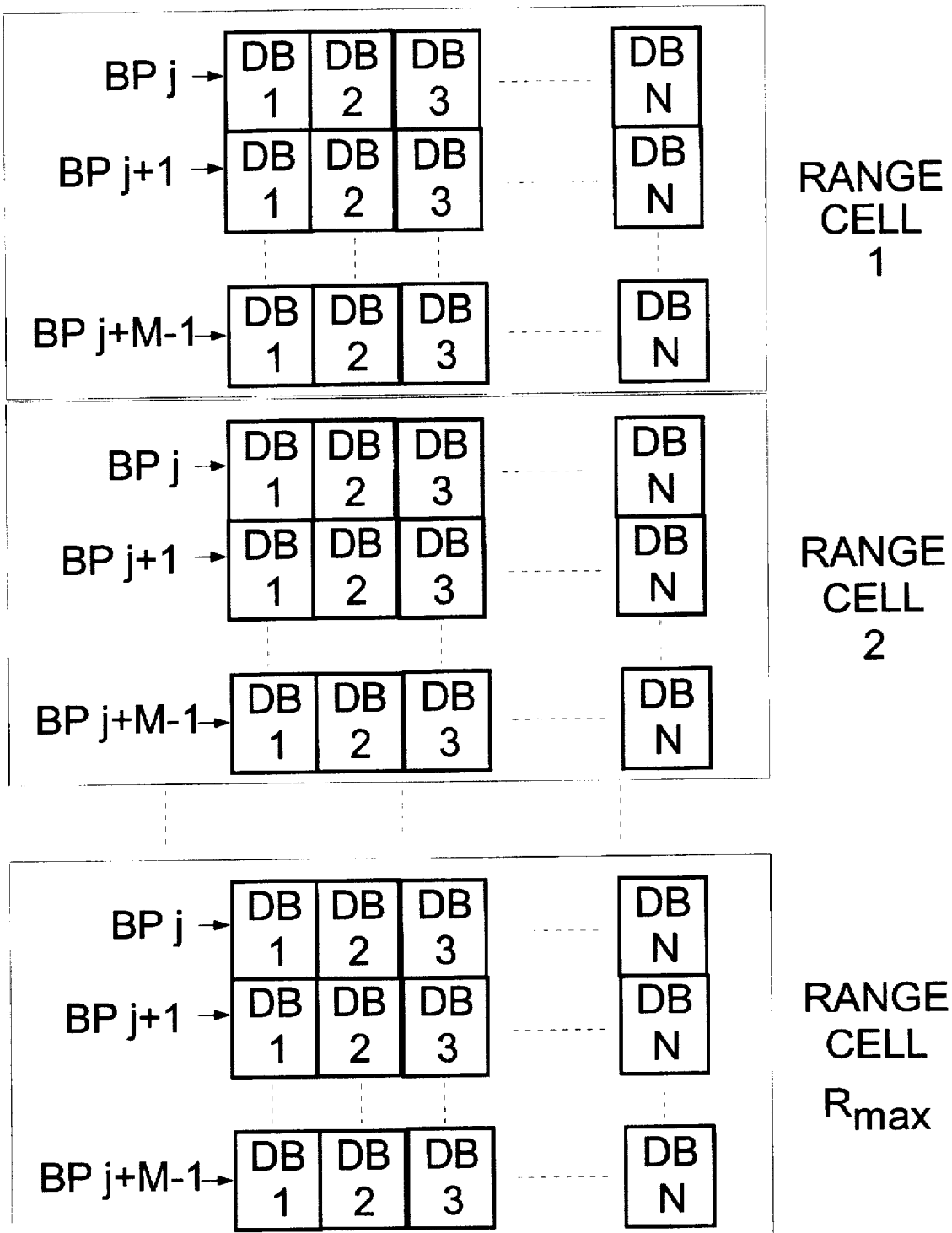
FIG. 5 is a diagram of radar signal sample organization for multiple beams and range cells after Doppler processing in the present invention, where DB stands for Doppler Bin and BP stands for Beam Position.

FIG. 4 shows a block diagram of the adaptive post-Doppler sequential beam processor of the present invention. Incoming radar signals are processed as in FIG. 2. Then multiple Doppler-processed output signals 106 for various beam-pointing angles enter a post-Doppler multiple beam digital memory 160. The N individual Doppler bins that result from processing the N pulses of a given CPI for each pointing angle comprise Doppler-processed output signal 106 (which includes zero-padding). FIG. 5 shows the organization of post-Doppler multiple beam digital memory 160. Doppler processed output signal 106 for each beam position and range cell comprise the rows of the memory storage. While there is no restriction on the number of adjacent beams stored, the ensuing signal-processing steps require a minimum of M beam positions stored in memory.

Figure 6:
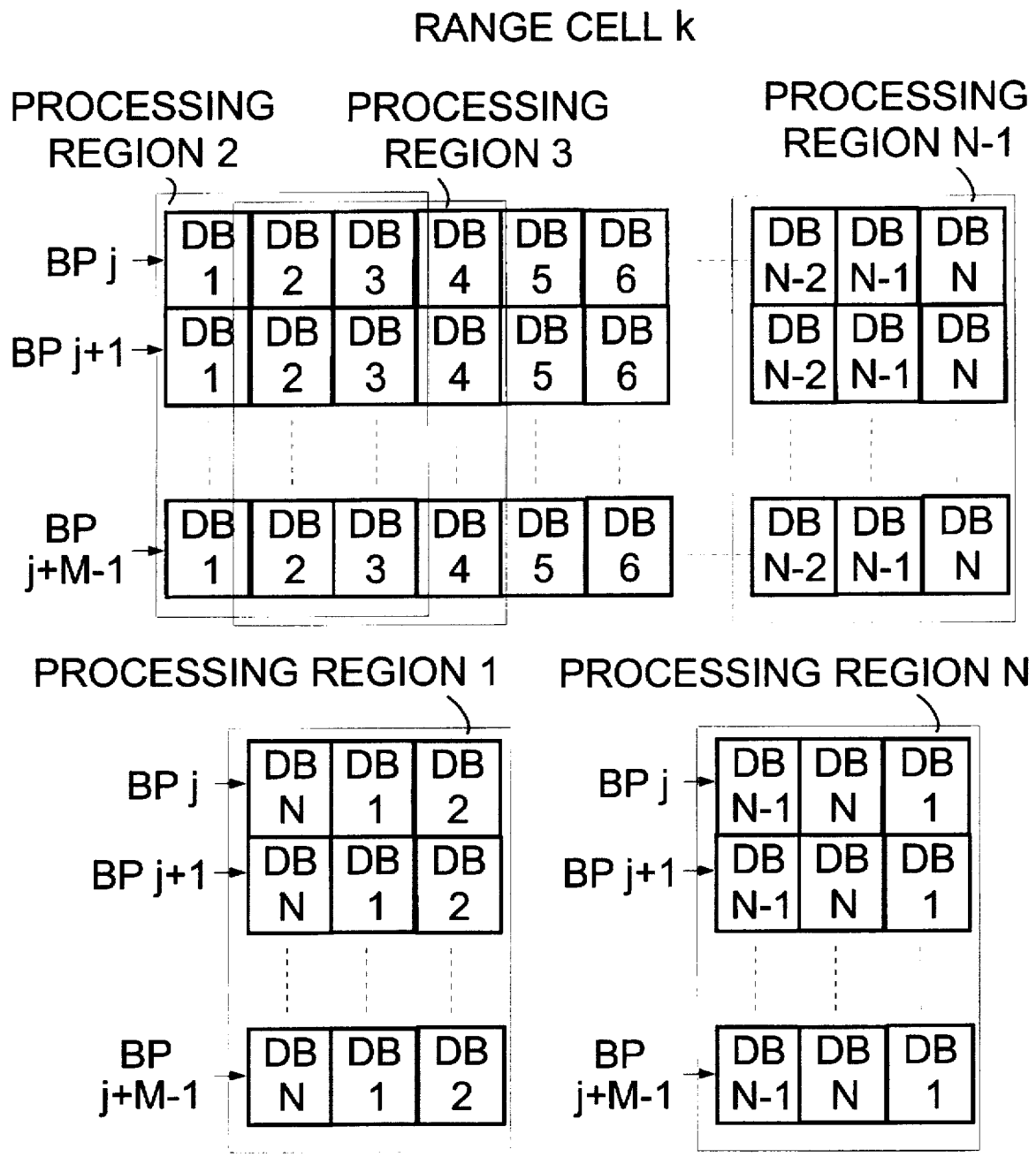
FIG. 6 is a diagram of sample processing regions in the angle-Doppler domain for the adaptive post-Doppler sequential beam processor of the present invention, where DB stands for Doppler Bin and BP stands for Beam Position.

Referring again to FIG. 4, a processing region selector 180 determines the size of each processing region, nominally taken as three adjacent beam positions and three Doppler bins. FIG. 6 depicts M by three processing regions for range cell k. In the three by three case, M is naturally set to the integer value of three. Processing regions 1 and N, shown separately for illustration, require wrapping-around to the other end of memory.

There is no requirement that all processing regions be of the same size. However, every Doppler bin for a selected beam position should be covered. For simplicity, the following discussion assumes that all processing regions are of the same dimension, M by P.

Referring again to FIG. 4, the processing region dimension passes as a signal 111 to a vectorizer 170 and a steering vector generator 190. Vectorizer 170 accepts selected parts of the data stored in post-Doppler multiple beam digital memory 160 as a signal 107 according to the processing regions depicted in FIG. 6 and the number of range cells required by a covariance matrix estimator 200 and a post-Doppler sequential beam adaptive processor 220.

The nominal value of range cells required to filter range cell k for the three-by-three processing region case is eighteen. In general, if the processing region is M by P, then estimating a covariance matrix nominally requires $2*M*P$ range cells. The range cells required for estimating the covariance matrix, called secondary data, include the M*P range cells on either side of range cell k and its guard cells. Normally, two guard cells are placed on each side of range cell k. Thus the secondary data comes from range cells k−3−M*P to k−3 and k+3 to k+3+M*P, since covariance matrix estimator 200 excludes range cell k and its guard cells at k−2, k−1, k+1, and k+2 to avoid whitening a potential target.

Figure 7:
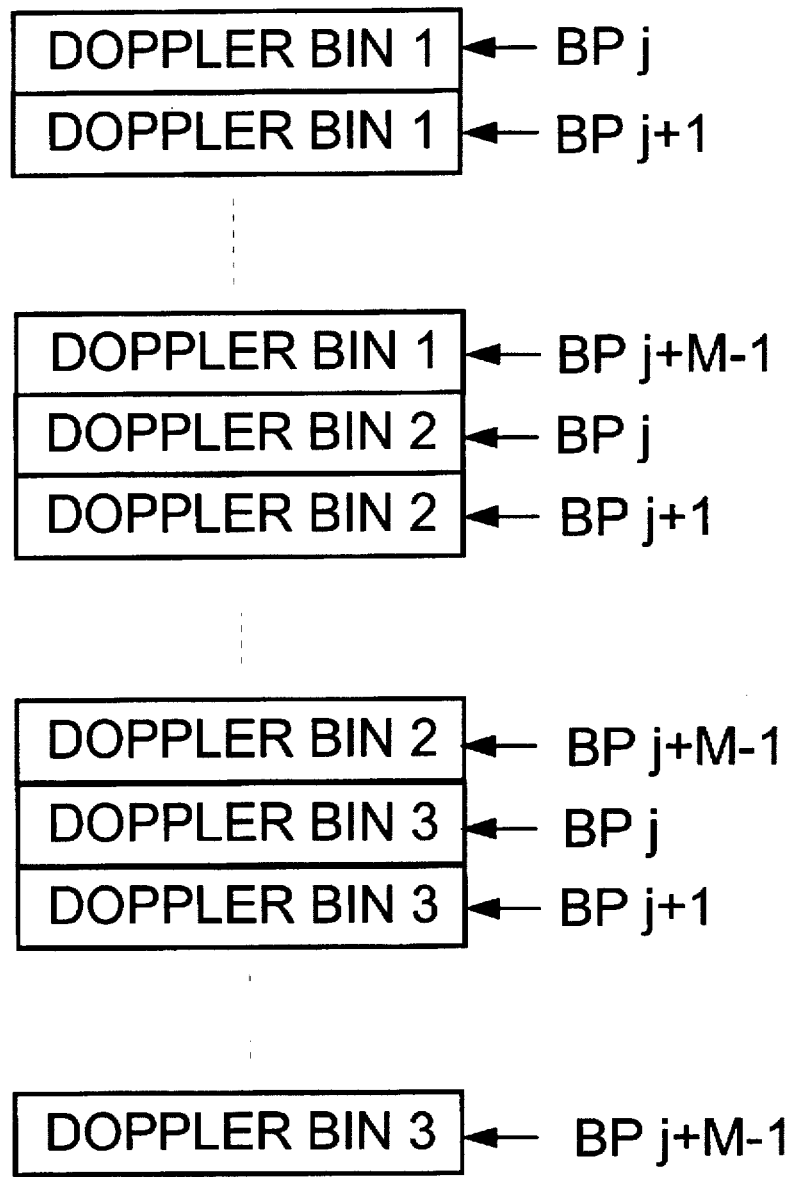
FIG. 7 is a diagram of a sample vectorized radar signal from angle-Doppler samples for the selected processing region two (2) and range cell k, where BP stands for Beam Position.

For each processing region, vectorizer 170 outputs a test data vector 108 to be adaptively processed and a sequence of adjacent vectorized secondary data 109 for estimating the covariance matrix. FIG. 7 shows an example, $X_k^{(2)}$, of the format of test data vector 108 for range cell k and processing region two (2). This format corresponds to stacking the P adjacent columns of the data stored in post-Doppler multiple beam digital memory 160 for processing region two (2) and range cell k. Each column of post-Doppler multiple beam digital memory 160 associates with a distinct Doppler bin. In FIG. 7, P has a nominal value of three. Thus, for processing region two (2), vectorizer 170 stacks the first three columns for the M beam positions and range cell k on top of each other. Vectorized secondary data 109 from adjacent range cells has an identical format.

Referring again to FIG. 4, covariance matrix estimator 200 forms an estimate of the frequency domain interference covariance matrix by first summing the outer products of vectorized secondary data 109 over a range for each processing region and then dividing by the total number of outer products used in the summation. For example, for processing region L, the covariance matrix estimate is:

$$R_k^{(L)} = \frac{1}{Ks} \left( \sum_{i=k-Q}^{k-3} X_i^{(L)}(X_i^{(L)})^H + \sum_{k+3}^{k+Q} X_i^{(L)}(X_i^{(L)})^H \right),$$

where Q=M*P+3, Ks=2*M*P, and the superscript "H" denotes the conjugate transpose. This computation assumes two guard cells on each side of range cell k.

Steering vector generator 190 generates a steering vector 113 that takes a very simple form in the frequency domain. Signal 111 enters steering vector generator 190, indicating the size of the processing region. Since we assume that the processing regions are all of the same dimension, M by P, steering vector 113 has length M*P by one. In the frequency domain, steering vector 113 has a value of unity for the angle-Doppler bin to be filtered and zero elsewhere. For example, in the three by three case, steering vector 113 is: S=[000010000]$^T$, where the superscript "T" denotes the transpose operation. Referring again to FIG. 7 and letting M=3, frequency-domain steering vector 113 steers to Doppler bin 2 and beam position j+1. In the general case, for M=3, steering vector 113 points to Doppler bin L for the Lth processing region and the (j+1)th beam position.

Referring again to FIG. 4, an estimated covariance matrix 112 for the Lth processing region and steering vector 113 enter a multiplier 210. The output of multiplier 210 is an adaptive weight vector 114 to be used for processing range cell k and processing region L. Frequency-domain adaptive weight vector 114 for the Lth processing region and k$^{th}$ range cell is:

$$W_k^{(L)} = S^H(R_k^{(L)})^{-1}.$$

Adaptive weight vectors 114 for all N processing regions enter post-Doppler sequential beam adaptive processor 220 consecutively, together with test data vector 108 that corresponds to the k$^{th}$ range cell and Lth processing region to be adaptively processed. Each test data vector 108 is of the form shown in FIG. 7.

Post-Doppler sequential beam adaptive processor 220 produces a plurality of outputs 115 for range cell k that correspond to each processing region, or equivalently, each Doppler bin. Each output 115 corresponds to the adaptively processed input test data vector 108 for the Lth processing region and yields a SINR substantially improved over conventional methods. Output 115 for the Lth processing region, corresponding to the Lth Doppler bin and k$^{th}$ range cell, is:

$$Y_k^{(L)} = W_k^{(L)} X_k^{(L)}.$$

Thus N signals, $Y_k^{(1)}, Y_k^{(2)}, \ldots, Y_k^{(N)}$, comprise output 115 for the k$^{th}$ range cell. These outputs then supply further processing, such as detection and tracking, as in the prior art system shown in FIG. 2.

Similar implementations of the post-Doppler sequential beam adaptive processor using a modified pulse-repetition-interval-staggered ("PRI-staggered") approach follow from the preceding discussion. In this case, the processor computes Doppler bins using overlapping or staggered CPIs or sub-CPIs, yielding multiple signals for the same Doppler bin. Next the adaptive processor combines signals from adjacent beams and multi-valued adjacent Doppler bins. The additional degrees of freedom offered by this modification can lead to improved interference nulling. For example, if one-hundred and twenty-eight (128) pulses comprise a CPI, Doppler processing can be applied first to pulses one (1) through 127, and then to pulses two (2) through 128, thereby yielding two distinct signals per Doppler bin, each with rotated phase information. This procedure doubles the adaptive filter's degrees of freedom, which can help detection in severe interference environments. Additional pulses may also be Doppler processed in a PRI-staggered manner for incorporation into the adaptive filter, thereby further increasing the adaptive filter's degrees of freedom.

ANALYSIS OF AIRBORNE MEASURED DATA

Analysis of measured airborne data demonstrates the utility of the present invention. This analysis uses several CPIs of measured data from a single channel, rotating antenna. Each CPI corresponds to a different angular direction. Although the beam is rotating throughout the CPI, we simplify by assuming that a single azimuth characterizes a given CPI, as discussed previously.

Referring to FIGS. 8–11, prior to any signal processing steps, a target-like signal is injected into the measured data with a Doppler frequency that corresponds to Doppler bin 103 and a location that corresponds to range cell 135 for a single azimuthal beam position. This target has a signal-to-noise ratio ("SNR") of 22 dB and a signal-to-clutter-plus-noise ratio ("SCNR") of approximately −35 dB.

Figure 8:
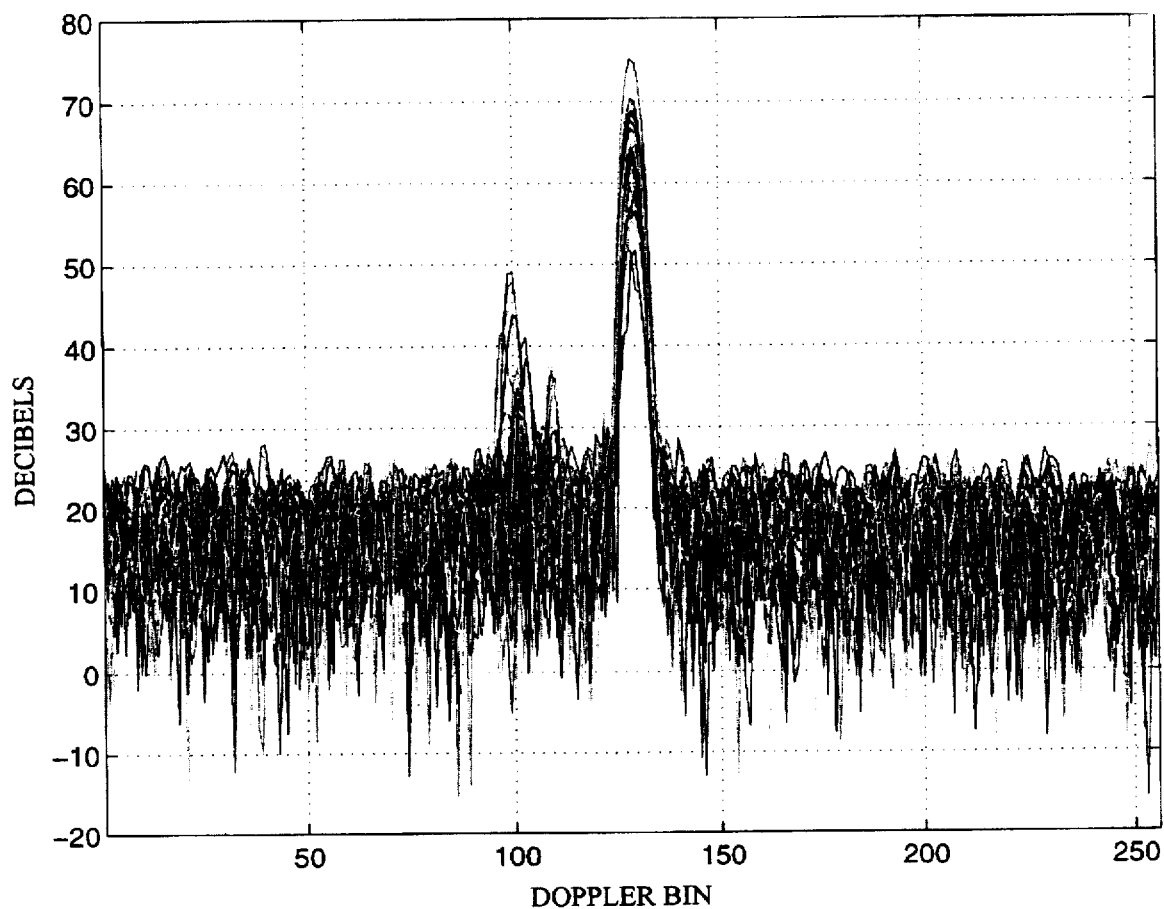
FIG. 8 shows the Doppler spectrum for multiple range cells using the prior-art signal processing.

FIG. 8 shows the interference spectrum for multiple range cells at the output of Doppler processor 150 in the prior-art system shown in FIG. 2. A Hanning window function is applied to the pulses prior to Doppler processing. Note that mainbeam clutter is centered approximately at the Doppler frequency that corresponds to Doppler bin 130. A second source of interference is centered at the Doppler frequency that corresponds to Doppler bin 100. This second source of anomalous interference may result, for example, from anomalous scattering effects. Both sources of interference severely degrade the capacity to detect weak targets between the Doppler frequencies that correspond to Doppler bins 94 and 135.

Figure 9:
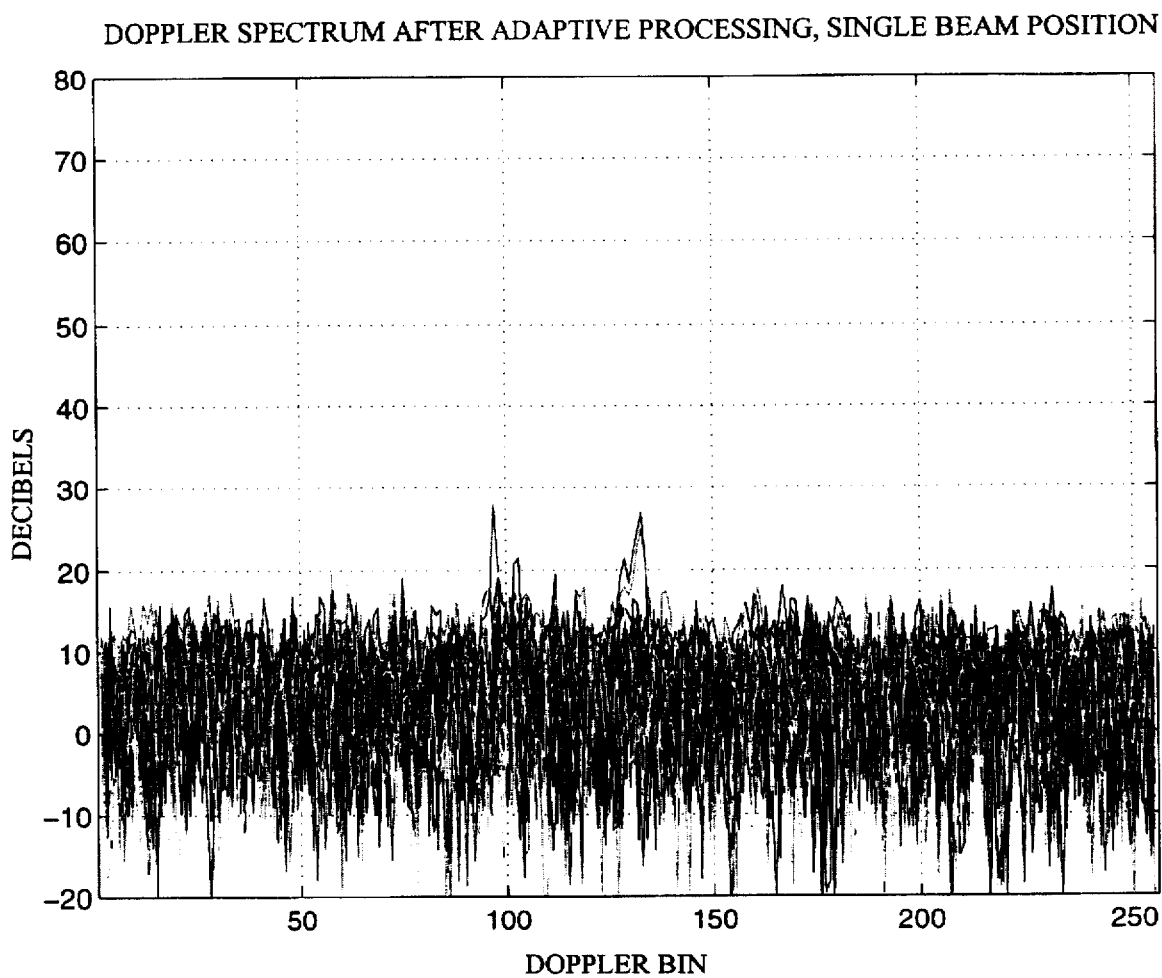
FIG. 9 shows the Doppler spectrum for multiple range cells after applying the adaptive post-Doppler sequential beam processor of the present invention, showing substantial cancellation of mainbeam clutter and anomalous interference.

FIG. 9 shows the output for a single range cell after processing the data with the apparatus and method of the present invention shown in FIG. 4. Post-Doppler sequential beam adaptive processor 220, applied to this measured data set, employs a processing region defined as two beam positions by three Doppler bins for all Doppler bins. The number of secondary data, Ks, is set to the nominal value of twelve (12) range cells. There is a lag of one beamwidth between the two processed beams. The results shown in FIG. 9 correspond to the second beam position. The apparatus and method of the present invention reduce the mainbeam clutter and the anomalous interference, centered at Doppler bin 130 and Doppler bin 100 respectively, nearly to the noise level.

A slight residual interference remains uncanceled. It can be reduced further by processing adjacent beams with no spacing and adding degrees of freedom by increasing each processing region to three beam positions by three Doppler bins.

Conventional processing by the prior-art system shown in FIG. 2 cannot reduce this anomalous interference. Nor can such conventional processing mitigate the effects of other sources of interference, like jamming. The present invention, on the other hand, can reduce the effects of electronic countermeasures ("ECM") like jamming. Furthermore, while a conventional high-pass filter/airborne moving target indicator ("MTI"), not shown in the prior-art system of FIG. 2, can effectively cancel the mainbeam clutter, it can do so only at the expense of a wider stopband than the adaptive implementation, thereby undesirably limiting the minimum discernible velocity of the radar.

Figure 10:
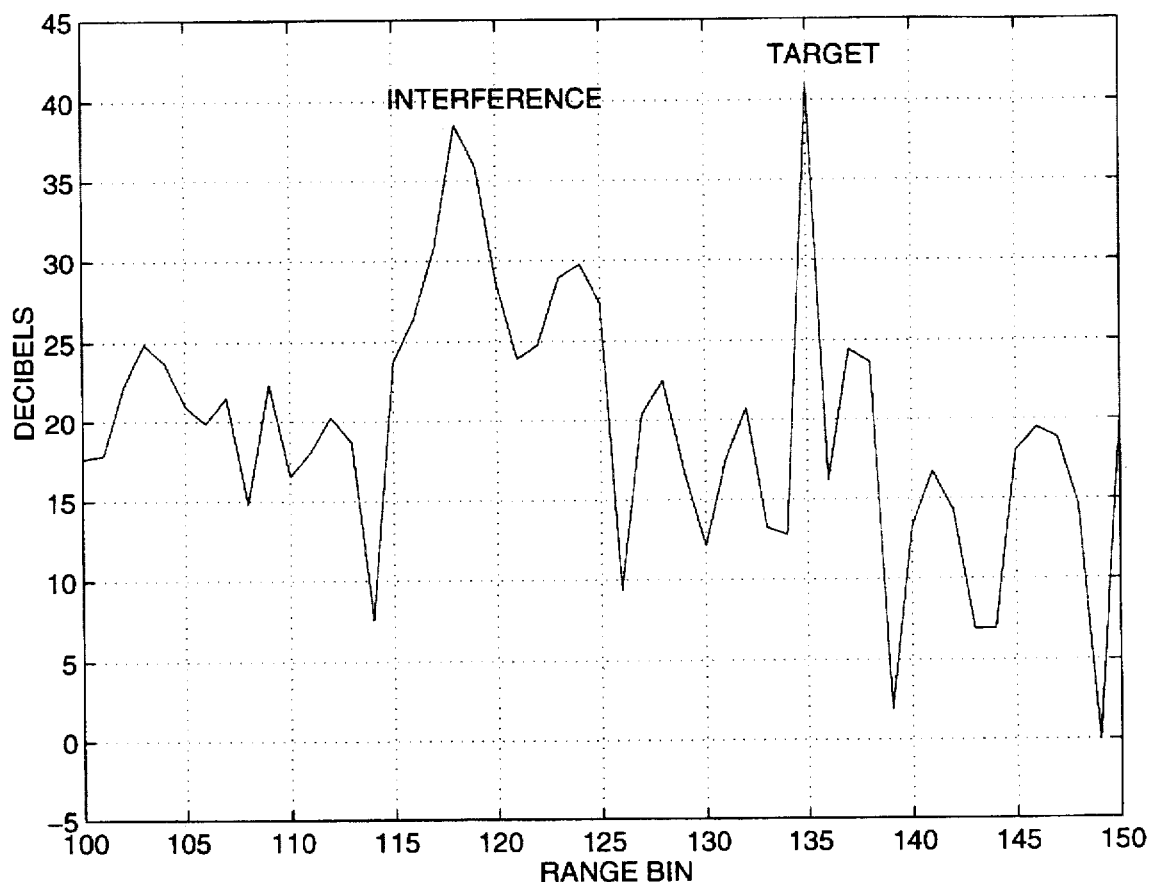
FIG. 10 shows the output of Doppler bin 103 versus range under the signal processing of the prior art.

The adaptive processor adjusts the adaptive weights to maximize SINR. A trade-off exists between interference cancellation and signal gain. Thus the question remains how the injected signal passes through the adaptive processor in the preceding experiment. FIG. 10 shows the output of conventional processing for Doppler bin 103 versus range. The target, whose position is known a priori, is visible at range cell 135. However, significant interference is also present between range cells 115 and 125. The detection threshold can be set to pass the signal at range cell 135 together with false alarms from anomalous interference. On the other hand, the false alarm rate is a critical parameter. Thus the best solution to this dilemma is to raise the detection threshold so that neither the interference nor the target crosses the threshold. But the price to be paid for adopting this solution is that the target is undetected.

Figure 11:
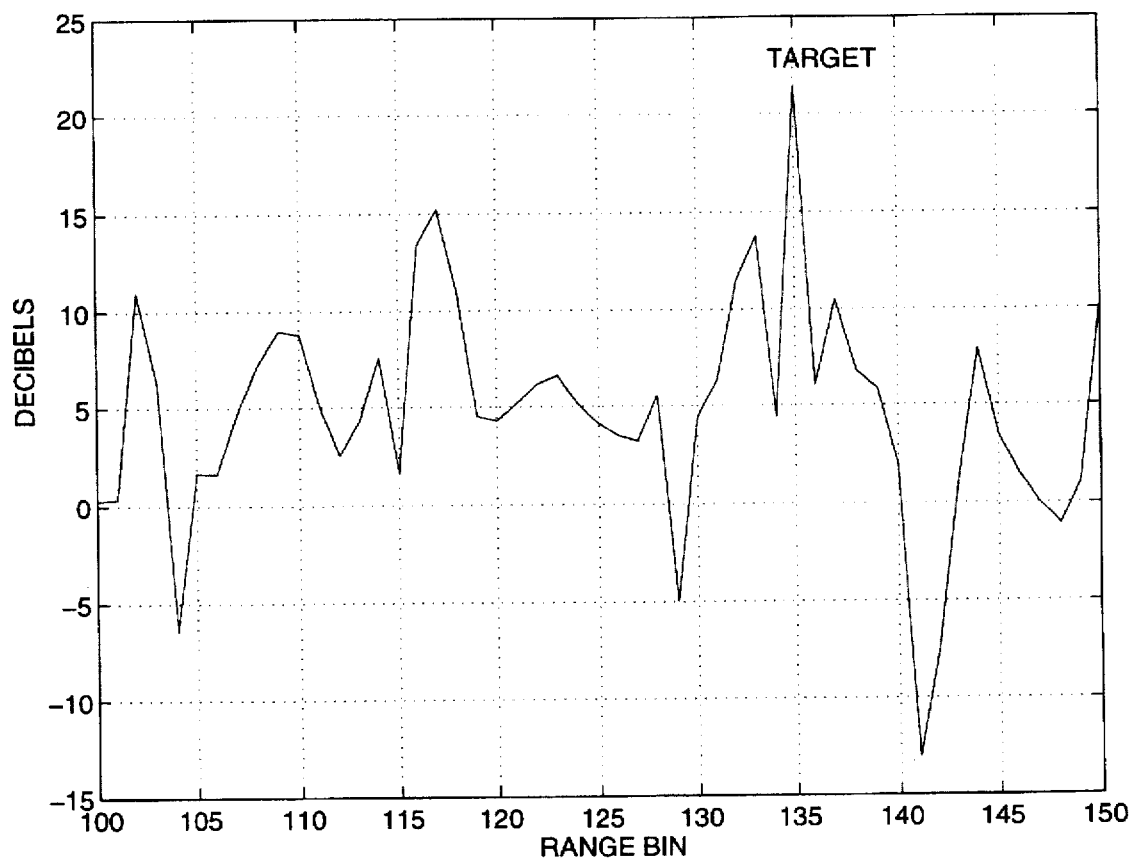
FIG. 11 shows the output of the adaptive post-Doppler sequential beam processor of the present invention for Doppler bin 103 versus range.

FIG. 11 shows the output of the adaptive processor for Doppler bin 103 versus range, corresponding to the same interval shown in FIG. 10. The adaptive processor of the present invention successfully both uncovers the target and suppresses the interference. There is nearly 7 dB separation between the target and the highest interference peak. The detection threshold can be set at an even higher level, allowing the target to be detected while avoiding false alarms from spurious interference.

Thus a comparison among FIGS. 8–11 shows that the present invention improves the detection performance of airborne radar that employs a single channel, rotating antenna. This improvement in performance is dramatic compared to the conventional processing of the prior art. Furthermore, the present invention is a low-cost alternative to upgrading existing single channel antennas with costly hardware modifications that add extra channels. In the absence of tests, it is not apparent that extra channels can even provide an improvement in performance.

Clearly many modifications and variations of the present invention are possible in light of the above teachings, and it is therefore understood that, within the scope of the inventive concept, that the invention may be practiced otherwise than as specifically claimed.

What is claimed is:

1. In a system for processing signals that employs a single receive channel, a method for space-time adaptive processing of said signals comprising the steps of:

receiving a plurality of signals from an area potentially containing at least one target;

moving said single receive channel to combine said plurality of signals into a plurality of groups, each of said groups representing a distinct processing interval that corresponds to a distinct spatial orientation;

correlating an interference component of said signals over a plurality of said distinct processing intervals, whereby said step of correlating yields correlated interference for each of said distinct processing intervals; and canceling said correlated interference by adaptively combining said plurality of signals by means of an adaptive filter, whereby interference obscuring said at least one target is reduced.

2. The method of claim 1, wherein said step of moving combines said plurality of signals into three groups as follows:

a first group comprising coherent processing intervals within which a potential target may be located;

a second group comprising coherent processing intervals adjacent said first group; and a third group comprising secondary signals used for determining adaptive weights.

3. The method of claim 2, wherein said step of correlating uses said second group to determine said interference component to be applied in said step of canceling to said first group.

4. The method of claim 1, wherein said step of receiving comprises obtaining said plurality of signals from a pulse Doppler radar with a single rotating antenna.

5. The method of claim 4, wherein said plurality of signals is obtained by transmitting and receiving at a plurality of distinct time intervals each of which corresponds to a specific spatial orientation, that is, to a specific angular direction of said single rotating antenna.

6. Apparatus for space-time adaptive processing of signals from which to identify one of presence and absence of at least one potential target, said apparatus including a single receive channel, which comprises:

means for receiving a plurality of signals from an area potentially containing at least one target;

means for moving said single receive channel to combine said plurality of signals into a plurality of groups, each of said groups representing a distinct processing interval that corresponds to a distinct spatial orientation;

means for correlating an interference component of said signals over a plurality of said distinct processing intervals, whereby said step of correlating yields correlated interference for each of said distinct processing intervals; and means for canceling said correlated interference, said means including an adaptive filter for adaptively combining said plurality of signals, whereby interference obscuring said at least one potential target is reduced.

7. Apparatus as in claim 6, wherein said apparatus including a single receive channel is a pulse Doppler radar with a rotating antenna.

8. Apparatus as in claim 6, wherein said means for correlating includes a steering vector generator and a covariance matrix.

9. Apparatus as in claim 6, wherein said means for canceling includes a post-Doppler sequential beam adaptive processor.

10. Apparatus as in claim 7, wherein said pulse-Doppler radar is airborne.

11. Apparatus as in claim 7, wherein said pulse-Doppler radar has a high pulse repetition frequency.

12. Apparatus as in claim 6, wherein said apparatus including a single receive channel is an active sonar system.

13. Apparatus as in claim 6, wherein said apparatus including a single receive channel is a passive sonar system.

14. Apparatus for space-time adaptive processing of signals from which to identify one of presence and absence of at least one potential target, which comprises:

a device having a single channel for receiving said signals;

said device being adapted for moving into a series of positions;

said device occupying said series of positions consecutively to receive, when in each of said series of positions, each of a sequence of said signals;

means for dividing said sequence into at least two groups;

means for transforming each of said at least two groups; and a signal combiner adapted for weighting and summing said transformed groups to cancel interference components thereof, whereby said at least one potential target is unmasked.

15. Apparatus as in claim 14, wherein said device is a pulse Doppler radar with a rotating antenna.

16. Apparatus as in claim 14, wherein said signal combiner includes a steering vector generator, a covariance matrix estimator, and a post-Doppler sequential beam adaptive processor.

17. Apparatus as in claim 15, wherein said pulse-Doppler radar is airborne.

18. Apparatus as in claim 15, wherein said pulse-Doppler radar has a high pulse repetition frequency.

19. Apparatus as in claim 14, wherein said device is an active sonar system.

20. Apparatus as in claim 14, wherein said device is a passive sonar system.

* * * * *